May 29, 1962 W. G. SCHWAB 3,036,480
AUTOMATIC CONTROL OF MULTI-STAND ROLLING MILLS
Filed July 10, 1957 4 Sheets-Sheet 1

Fig.1.

INVENTOR.
William G. Schwab
BY
ATTORNEY

May 29, 1962 W. G. SCHWAB 3,036,480
AUTOMATIC CONTROL OF MULTI-STAND ROLLING MILLS
Filed July 10, 1957 4 Sheets-Sheet 2

Fig. 2.

INVENTOR.
William G. Schwab
BY
Attorney

United States Patent Office 3,036,480
Patented May 29, 1962

3,036,480
AUTOMATIC CONTROL OF MULTI-STAND ROLLING MILLS
William G. Schwab, Birmingham, Ala., assignor to The Electron-Machine Corporation, Umatilla, Fla., a corporation of Florida
Filed July 10, 1957, Ser. No. 670,940
21 Claims. (Cl. 80—35)

The present invention relates to a velocity-ratio method and apparatus for the automatic control of rolling conditions in a multistand rolling mill such that the thickness of the finished product as it emerges from the last stand of the mill is maintained uniformly constant at a predetermined desired value.

One of the principal features and advantages of the present invention is its ability to exercise effective control over the output thickness during acceleration and deceleration of the mill. Ordinarily, effective thickness control during periods of acceleration and deceleration is impossible by manual operation of the usual manual controls. The present invention provides highly significant and extremely valuable economies by reducing the amount of unusable off-gauge material at the head end and tail end of each strip.

Generally, the invention comprises control means for maintaining the strip velocity ratios amongst the respective stands at appropriately constant values with respect to each other during the transition period from threading speed to the full rolling speed of the multi-stand mill. Manually adjustable control means are provided for accelerating and decelerating all of the stands in unison from threading speed to full running speed. An automatic-manual switch is provided for cutting out the automatic control while the operator adjusts the stands for optimum performance at full running speed.

During the course of manual adjustment by the operator, memory devices set themselves to reproduce and maintain the same velocity ratios as those which were established manually at full rolling speed during acceleration and deceleration of the mill. Automatic thickness control is provided for the first stand by means of a thickness gauge which regulates the screw-down mechanisms of the first stand only. In this manner, the strip thickness is maintained constant as it emerges from the first stand and enters the second stand. As the mill speed is varied by the manual control, a series of strip velocity measuring devices which are connected to individual drive motor speed controls for the several stands, cooperate to maintain the correct strip velocities on a proportional or ratio basis for each stand.

Additionally, there is a common gain control for a group of speed control amplifiers which is so arranged that automatic control is suspended at threading speed and the mill responds to the operator's controls as if there were no automatic control. However, when the threading operation is completed and the mill is accelerated to full speed, the automatic control becomes effective during the period of acceleration and maintains the correct strip velocity ratios for obtaining constant output thickness from the last stand.

In addition to the provision of automatic thickness control at the output of the first stand, a cyclically operative timing circuit repeatedly checks the output thickness during operation at higher mill speeds and minor corrections are made at appropriate intervals in the drive motor speed of the first stand to obtain the correct finished thickness at the output of the last stand. The repetition rate of successive corrective adjustments in the speed of the first stand varies in accordance with the operating speed of the mill so that the effect of a speed correction at the first stand will have reached the last stand before any further correction is attempted.

The velocity ratio control of the present invention actually controls the thickness of the finished strip while the mill is operating at normal speed and it provides a certain limited amount of control of the finished thickness during acceleration and deceleration of the mill thus reducing the amount of off-gauge material which would otherwise be rolled at the head end and tail end of each strip. Additionally, the velocity ratio control permits the operators to have effectively or nearly complete control of the mill at all times. This is particularly important during threading operation when the step of shutting off the automatic control is not required. The velocity-ratio control is automatically shut off during threading and automatically becomes effective when the mill is again speeded up to an operational range of outputs where automatic thickness control becomes possible.

The invention will be better understood from the following description with reference to the accompanying drawing forming a part hereof.

Referring to the drawing:

FIGURES 2 and 4, taken together and with their correspondingly designated lettered terminals connected to each other, constitute a schematic circuit diagram of a modified form of control system wherein each drive motor armature is supplied with current from a separate individual generator, the terminal voltages of all of the individual generators being varied in unison by variation of a manually adjustable mill reference voltage.

Figure 1:
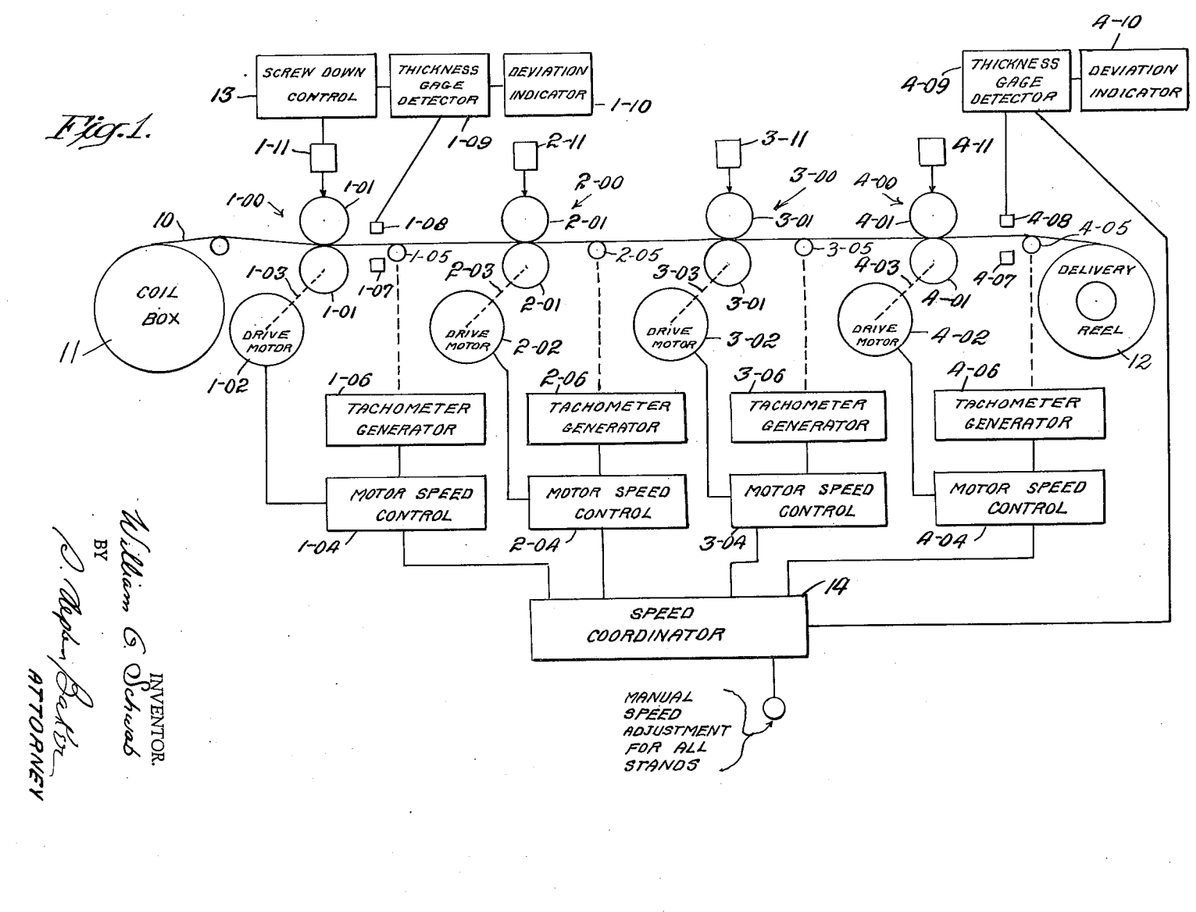
FIGURE 1 is a diagrammatic representation of a four stand rolling mill equipped with a velocity-ratio control system in accordance with the invention.

Referring to FIGURE 1, there is diagrammatically shown a four stand cold reduction mill. The four stands are designated generally as 1—00, 2—00, 3—00, and 4—00, respectively. A strip of metal 10, which may be steel for example, is fed from a coil box 11 to a delivery reel 12, passing successively through the four stands 1—00, 2—00, 3—00 and 4—00. Each stand comprises a set of cooperating rolls 1—01, 2—01, 3—01 and 4—01, respectively. Each set of rolls 1—01, 2—01, 3—01 and 4—01 effects a certain amount of thickness reduction in the strip 10 as it passes therebetween.

The rolls 1—01 of stand 1—00 are driven by a direct current motor 1—02 which is connected to drive the rolls 1—01 through suitable mechanical coupling means diagrammatically represented by the dashed line 1—03. The other stands are similarly provided with individual drive motors 2—02, 3—02 and 4—02 and mechanical couplings 2—03, 3—03 and 4—03 for driving the sets of rolls 2—01, 3—01 and 4—01, respectively. Each of the drive motors 1—02, 2—02, 3—02 and 4—02 is provided with an individual speed control 1—04, 2—04, 3—04 and 4—04. These speed controls are responsive to a unidirectional control potential, as described in greater detail below. Moreover, the speed controls 1—04, 2—04, 3—04 and 4—04 may take alternative forms such as those specifically illustrated in FIGURE 3 or in FIGURE 4, for example.

At the output side of each of the four stands 1—00, 2—00, 3—00 and 4—00, there is a friction roller 1—05, 2—05, 3—05 and 4—05, respectively. Each friction roller 1—05, 2—05, 3—05 and 4—05 engages the strip 10 and is driven thereby at an angular velocity which is directly proportional to the linear velocity of the strip 10 at its emergence from the nips of the rolls 1—01, 2—01, 3—01 and 4—01, respectively.

Each of the friction rollers 1—05, 2—05, 3—05 and 4—05 is mechanically connected to drive a tachometer generator 1—06, 2—06, 3—06 and 4—06, respectively. Each of the tachometer-generators 1—06, 2—06, 3—06 and 4—06 produces a direct current output voltage which is directly proportional to the linear velocity of the strip 10 as it emerges from the rolls of its associated stand. These separate output voltages are all supplied to a master speed coordinator 14, later to be described.

The master speed coordinator 14 correlates the motor controls 1—04, 2—04, 3—04 and 4—04 with the tachometers 1—06, 2—06, 3—06 and 4—06 so that the ratios of the velocities of the different portions of the strip 10 to each other as it emerges from each of the stands 1—00, 2—00, 3—00 and 4—00 respectively are maintained constant with respect to the final strip velocity as measured by the tachometer generator 4—06. Accordingly, all of the ratios of the several emerging strip velocities to each other will be maintained constant for all of the four stands.

At the output of the first stand 1—00 there is provided a gauge for continuously measuring the thickness of the emerging strip. The thickness gauge may be of the type disclosed in Vossberg Patent No. 2,549,402 issued on April 17, 1951 and being of common ownership herewith. The gauge comprises an X-ray source 1—07, an X-ray pickup 1—08, and a detector 1—09. The detector 1—09 produces a unidirectional deviation signal having a magnitude and polarity which are in accordance with the magnitude and direction of deviation of the actual strip thickness from a predetermined nominal thickness. Advantageously, an indicator 1—10 may be connected to the detector 1—09 to provide a visual indication of the deviation of the actual thickness from the desired nominal thickness. The gauge 1—09 is connected to automatic screw-down control mechanism 13 and conventional screw-down mechanism 1—11 (motor, gearing, etc.) for maintaining constant thickness in the strip 10 as it emerges from the first stand 1—00 and enters the second stand 2—00. The screw-down mechanisms 2—11, 3—11 and 4—11 are manually adjusted.

At the output of the last stand 4—00, a similar thickness gauge is provided comprising an X-ray source 4—07, and X-ray pickup 4—08, a detector 4—09 and a visual deviation indicator 4—10. The detector 4—09 is connected to the master speed coordinator 14 as described below in connection with FIGURE 2.

Figure 2:
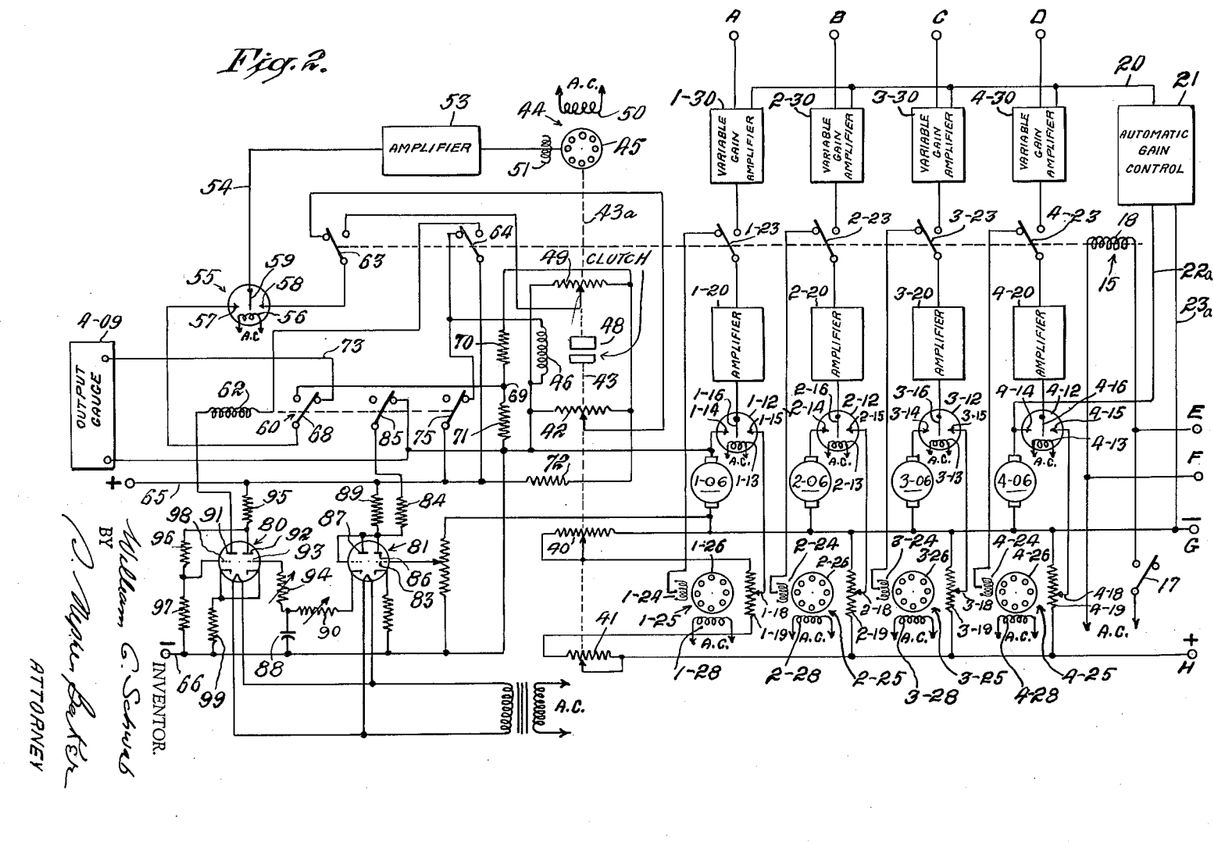
FIGURES 2 and 3, taken together and with their correspondingly designated lettered terminals connected to each other, constitute a schematic circuit diagram of a control system in accordance with the invention and adapted for use in situations where all of the drive motor armatures are energized from a common generator of manually adjustable voltage, the voltage variation of the common generator being utilized to change the speeds of all of the drive motors in unison.

Referring to FIGURE 2, the tachometer generators 1—06, 2—06, 3—06 and 4—06 are connected to vibrators 1—12, 2—12, 3—12 and 4—12, respectively. The vibrators comprise respective operating windings 1—13, 2—13, 3—13 and 4—13 all of which are continuously energized from a suitable source of alternating current designated "A.C." The vibrators 1—12, 2—12, 3—12 and 4—12 also include stationary contacts 1—14, 2—14, 3—14 and 4—14 to which the tachometer generators 1—06, 2—06, 3—06 and 4—06 are connected. The vibrators also comprise further stationary contacts 1—15, 2—15, 3—15 and 4—15 which are connected to the movable contacts 1—19, 2—18, 3—18 and 4—18 of potentiometers 1—18, 2—19, 3—19 and 4—19, respectively.

The vibrators 1—12, 2—12, 3—12 and 4—12 are provided with movable contacts 1—16, 2—16, 3—16 and 4—16 which vibrate between stationary contacts 1—14 and 1—15, 2—14 and 2—15, 3—14 and 3—15, and 4—14 and 4—15, in synchronism with the line frequency of the alternating current supply "A.C." Accordingly, there is produced at each of the moving contacts 1—16, 2—16, 3—16 and 4—16 an alternating potential of polarity and peak amplitude which are determined by the polarity and magnitude of the potential difference, if any, between the stationary vibrator contacts 1—14 and 1—15 in the case of vibrator 1—12. Similar potentials are produced at the vibratory movable contacts 2—16, 3—16 and 4—16 of the other vibrators 2—12, 3—12 and 4—12.

These alternating potentials are applied to the input circuits (each shown as a single line for simplicity of illustration) of amplifiers 1—20, 2—20, 3—20 and 4—20, respectively. The outputs of the amplifiers 1—21, 2—21, 3—21 and 4—21 are connected to transfer contacts 1—23, 2—23, 3—23 and 4—23 of a six-pole double throw transfer relay designated generally as 15.

There is an "Automatic-Manual" switch 17 which is open in its "Manual" position as shown. When thrown to its "Automatic" position, the switch 17 energizes the operating winding 18 of transfer relay 15. With switch 17 in its "Manual" position, the outputs of the amplifiers 1—20, 2—20, 3—20 and 4—20 are connected to the control windings 1—24, 2—24, 3—24 and 4—24 of reversible two-phase servomotors 1—25, 2—25, 3—25 and 4—25, respectively. The amplifier output connections, like their input circuits, are diagrammatically shown as single lines for simplicity of illustration.

Each servomotor 1—25, 2—25, 3—25 and 4—25 comprises a rotor 1—26, 2—26, 3—26 and 4—26 which is mechanically connected as indicated by the dashed line, to displace the movable contact 1—18, 2—18, 3—18 and 4—18, respectively, of one of the potentiometers 1—19, 2—19, 3—19 or 4—19 which is associated therewith. Each of the servomotors 1—25, 2—25, 3—25 and 4—25 is provided with a continuously energized field winding 1—28, 2—28, 3—28 and 4—28, respectively, all of which are connected to the source "A.C." for energization therefrom.

With the switch 17 in its "Manual" position, as shown, the outputs of amplifiers 1—20, 2—20, 3—20 and 4—20 are connected to the servomotor control windings 1—24, 2—24, 3—24 and 4—24 so that the movable contacts of the potentiometers 1—19, 2—19, 3—19 and 4—19 are adjusted to equalize the voltages at the two stationary contacts of each vibrator 1—12, 2—12, 3—12 and 4—12. With the switch 17 in its "Automatic" position, the control windings of all of the servomotors are disconnected and the individual settings of the several potentiometers will remain fixed in their respective positions of adjustment to which they were set by the servomotors 1—25, 2—25, 3—25 and 4—25 while the switch 17 was in its "Manual" position. As described in greater detail below, the potentiometers serve as memory devices which retain the mill speed ratio adjustments made by the operators with the mill running at normal speed and with switch 17 in the "Manual" position.

With switch 17 in its "Automatic" position, the outputs of amplifiers 1—20, 2—20, 3—20 and 4—20 are connected to the inputs of variable gain amplifiers 1—30, 2—30, 3—30 and 4—30, respectively. A common gain control connection 20 extends to all of the variable gain amplifiers 1—30, 2—30, 3—30 and 4—30 from a common gain control circuit 21. The gain control potential which is applied to the gain control connection 20 by gain control circuit 21 is determined in accordance with the voltage applied to gain control circuit input conductors 22a and 23a. The input conductors 22a and 23a are connected to the tachometer generator 4—06 at the output of the last stand 4—00. When the output strip velocity is above threading speed and high enough to permit effective automatic control of finished strip thickness, the gain control circuit 21 renders the amplifiers 1—30, 2—30, 3—30 and 4—30 operative. At lower speeds and particularly at the threading speeds, the gain control circuit 21 renders the amplifiers 1—30, 2—30, 3—30 and 4—30 inoperative to effect any speed adjustments in the speeds of the drive motors.

Figure 3:
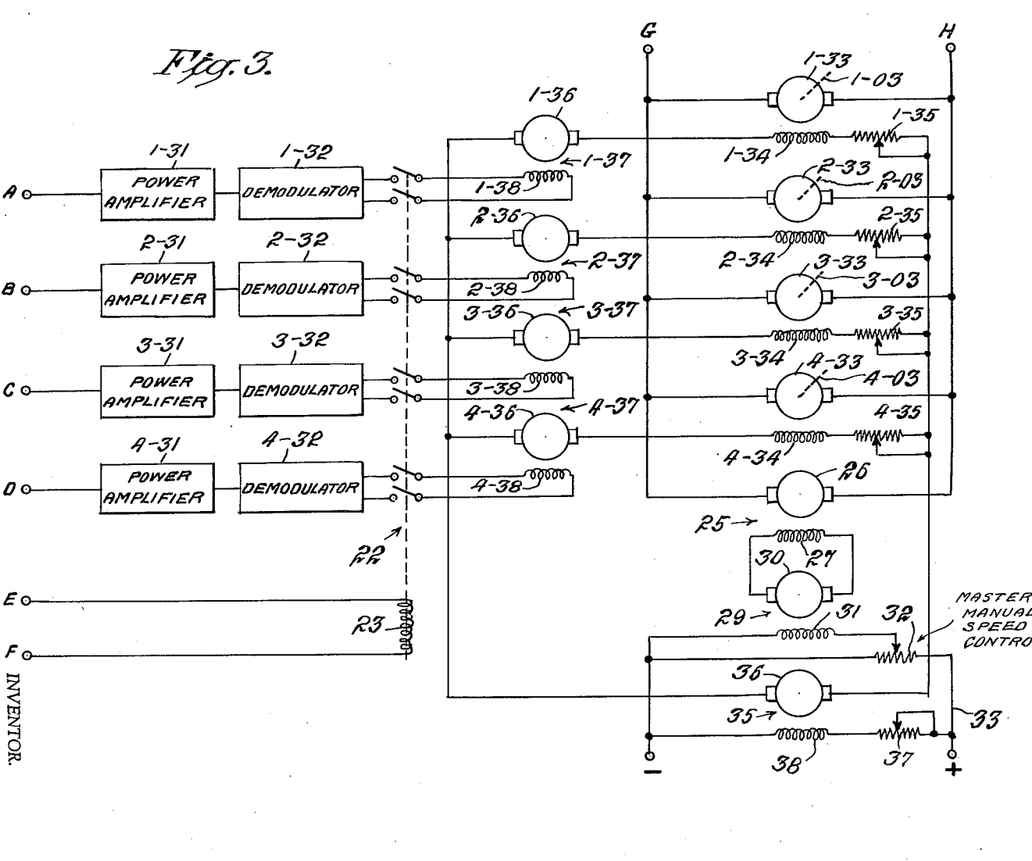

Considering FIGURES 2 and 3, taken together with terminals A to H of FIGURE 2 connected to terminals A to H of FIGURE 3, the speeds of the drive motors 1—02, 2—02, 3—02 and 4—02 are controlled to maintain predetermined speed ratios established by the settings of the memory potentiometers 1—19, 2—19, 3—19 and 4—19.

In the arrangement of FIGURES 2—3, the amplifiers 1—30, 2—30, 3—30 and 4—30 are connected through power amplifiers 1—31, 2—31, 3—31 and 4—31 to demodulators 1—32, 2—32, 3—32 and 4—32, respectively. There is an eight-pole single throw contactor 22 which is provided with an operating winding 23. The operating winding 23 is connected in multiple with the operating winding 18 of transfer relay 15 through the interconnected terminals E and F. In this manner, the contacts of contactor 22 are closed when the "Automatic-Manual" switch 17 is in is its "Automatic" position and are open when this switch is in its "Manual" position.

The drive motors 1—02, 2—02, 3—02 and 4—02 comprise respective armatures 1—33, 2—33, 3—33 and 4—33 together with operatively associated field windings 1—34, 2—34, 3—34 and 4—34. Each of the field windings is connected in series with a separate manually adjustable field rheostat 1—35, 2—35, 3—35 and 4—35, respectively. The armatures 1—33, 2—33, 3—33 and 4—33 are all connected in multiple and supplied with power from a common main generator 25. The armature 26 of main generator 25 is connected to supply power at variable voltage to all of the drive motor armatures so that the individual speeds of all of the motors may be varied in unison.

The output voltage delivered by main generator 26 is determined by the excitation of its field winding 27 which is supplied with current by a main exciter 29. The main exciter 29 has an armature 30 which is connected directly to the field winding 27 of the main generator 25. The field winding 31 of the main exciter 29 is supplied with current from a manually adjustable master speed control potentiometer 32 which is connected to a suitable constant voltage direct current supply line 33.

There is a common motor field exciter 35 which supplies field current to all of the drive motor field windings 1—34, 2—34, 3—34 and 4—34. The common motor field exciter 35 comprises an armature 36 one terminal of which is connected to the drive motor field rheostats 1—35, 2—35, 3—35 and 4—35. The other terminal of armature 36 is connected to the drive motor field windings 1—34, 2—34, 3—34 and 4—34 through the armatures 1—36, 2—36, 3—36 and 4—36 of speed regulating generators 1—37, 2—37, 3—37 and 4—37. The terminal voltage of exciter armature 36 is adjustable by means of a field rheostat 37 connected in series with a field winding 38 which provides excitation for the armature 36. The field winding 38 is energized from the constant voltage direct current supply line 33.

In FIGURE 3, the exciter armatures 30 and 36 and the armatures 1—36, 2—36, 3—36 and 4—36 are all driven at constant speed by suitable driving means (not shown). Suitable driving means may be a large synchronous motor, for example, mechanically connected to all of the armatures of a prime mover may be used, if desired. The drive motor armatures 1—33, 2—33, 3—33 and 4—33 are connected to drive the rolls 1—01, 2—01, 3—01 and 4—01 by mechanical connections 1—03, 2—03, 3—03 and 4—03 as described above with regard to FIGURE 1.

Each of the speed regulating generators 1—37, 2—37, 3—37 and 4—37 is provided with a field winding 1—38, 2—38, 3—38 and 4—38, respectively. With the switch 17 in its "Manual" position, the winding 23 of the eight-pole contactor 22 is deenergized and the field windings 1—38, 2—38, 3—38 and 4—38 are also deenergized. When the "Automatic-Manual" switch 17 is in its "Automatic" condition, the field windings 1—38, 2—38, 3—38 and 4—38 are connected to the respective outputs of the demodulators 1—32, 2—32, 3—32 and 4—32 to be energized therefrom, provided that the gain control circuit 21 (FIGURE 2) is causing the variable gain amplifiers 1—30, 2—30, 3—30 and 4—30 to be operative. The terminal voltage of the speed regulating armatures 1—36, 2—36, 3—36 and 4—36 will be varied in accordance with the polarity and amplitude of the alternating voltages on the vibratory contacts 1—16, 2—16, 3—16 and 4—16 of the vibrators 1—12, 2—12, 3—12 and 4—12, respectively. The resulting speed adjustments of the drive motors 1—02, 2—02, 3—02 and 4—02 is described in greater detail below.

As the speed of the mill is varied, the armature voltages of all of the drive motors are varied in unison by varying the output voltage of the main generator 25. This common mill voltage, which is approximately directly proportional to the mill speed, is applied to interconnected terminals G and H of FIGURES 2 and 3. The potentiometers 2—19, 3—19 and 4—19 (FIGURE 2) are directly connected to be energized from this voltage so that the potentials appearing on their adjustable contacts 2—16, 3—16 and 4—16 are proportional at all times to the general speed or strip output of the mill. So long as the voltages of the tachometer generators 2—06, 3—06 and 4—06 remain in their proper individual relationships to the strip output, there will be no input voltages applied to amplifiers 2—30, 3—30 and 4—30 and no corrective action will be required in the speeds of the drive motors 2—02, 3—02 and 4—02.

The first stand 1—00, however, is provided with automatic thickness control means which regulates its screw-down mechanism. It is the output thickness of the finished strip emerging from the last stand 4—00 which is to be maintained constant. Corrective changes in the screw-down adjustment of the first stand 1—00 to compensate for variations in the incoming strip 10 as it enters the first stand 1—00 may cause variations in the output thickness as measured by the gauge 4—09 (FIGURE 1). The variations in output thickness are corrected in such case by varying the speed of the first stand 1—00 to obtain thickness correction at the output of the last stand 4—00 with the speeds of the other stands 2—00, 3—00, and 4—00 maintained at their fixed ratios with respect to strip output speed.

In order to permit adjustment of the speed of the first stand 1—00 so that it may be varied from its ratio as established by the potentiometer 1—19, the potentiometer 1—19 is connected to the common mill voltage on terminals G and H through two ganged potentiometers 40 and 41, (FIGURE 2). These potentiometers are so arranged that their total resistance is constant and so that if the resistance of potentiometer 40 is increased, the resistance of potentiometer 41 is correspondingly decreased and vice versa. Accordingly, a shifting of the ganged potentiometers 40 and 41 is equivalent to a displacement of the resistor portion of the potentiometer 1—19 relative to its movable contact 1—16 without displacing the electrical center of the potentiometer 1—19. As a result, the tachometer generator 1—06 must operate at a modified speed in order to obtain a zero correction signal for the drive motor 1—02.

The ganged potentiometers 40 and 41 are adjusted in response to a deviation in output thickness from its correct value as determined by an error signal from the output gauge 4—09. After adjustment of the ganged potentiometers 40 and 41 in response to an error signal, a time interval is permitted to elapse before attempting a further correction. This time interval is variable and is automatically adjusted in accordance with the output speed of the mill so that the effect of a speed correction at the first stand 1—00 will have had time to be reflected as a change in output thickness by the gauge 4—09 before a further correction is attempted.

The output gauge detector 4—09 is repeatedly checked at intervals commensurate with the time required to effect an individual speed correction in the speed of the first stand 1—00 and which is long enough for the result of such speed correction to reach the output gauge 4—09. This portion of the apparatus for maintaining constant output thickness by separate individual speed adjustment of the first stand only, is shown in FIGURE 2.

There is another potentiometer 42 which is ganged to the potentiometers 40 and 41 (shown by dashed line 43 in FIGURE 2) so that all three potentiometers 40, 41 and 42 will always turn together. The ganged potentiometers 40—41—42 may be adjusted by means of a reversible two phase servomotor 44. The servomotor 44 has a rotor 45 which may be mechanically connected to adjust the ganged potentiometers 40—41—42 by energization of the operating winding 46 of an electromagnetic clutch 48. With clutch winding 46 deenergized, the servomotor 44 may operate but the ganged potentiometers 40—41—42 will remain fixed.

There is also a further potentiometer 49 which is directly connected to the rotor 45 of servomotor 44 by the mechanical connection 43a, such direct connection being continuous and independent of the condition of clutch 48. The servomotor 44 comprises a winding 50 which is continuously energized from the alternating current source "A.C." The servomotor 44 also comprises a control winding 51 which is connected to the output of an alternating current amplifier 53. The input circuit 54 (shown as a single line) of amplifier 53 is connected to receive an alternating control potential from a vibrator 55.

The vibrator 55 comprises an operating winding 56 which is continuously energized from the source "A.C." in phase with the winding 50 of servomotor 44. The vibrator 55 further comprises stationary contacts 57 and 58 and a vibratory contact 59 which alternately engages the stationary contacts 57 and 58 at the line frequency of the alternating current supply "A.C." The vibrator 55 is similar to the vibrators 1—12, 2—12, 3—12 and 4—12, described above.

The voltages which are applied to the stationary contacts 57 and 58 of the vibrator 55 are controlled conjointly by the transfer relay 15 and a cyclically operative three-pole relay 60. The transfer relay 15, as previously described, is controlled by the "Automatic-Manual" switch 17. The cyclically operative relay 60 comprises an operating winding 62 which is connected to a cyclically operative control circuit, later to be described.

With the "Automatic-Manual" switch 17 in its "Manual" position, a transfer contact 63 of relay 15 connects the right hand contact 58 of vibrator 55 to the moving contact of potentiometer 42. Another transfer contact 64 of relay 15 connects the winding 46 of clutch 48 to a direct current supply line comprising positive and negative conductors 65 and 66, respectively. Thus, with the switch 17 in its "Manual" position, the clutch 48 will maintain the potentiometer 42 connected to be driven by servomotor 44 under control of the vibrator 55.

During automatic operation, a transfer contact 68 of cyclically operative relay 60 alternately connects the left hand contact 57 of vibrator 55 either to a point of reference potential 69 or to the output of thickness gauge 4—09. The point 69 is at the junction between two serially connected equal resistors 70 and 71 which are energized in multiple with the potentiometers 42 and 49 from the D.C. line conductors 65 and 66 through a common voltage reducing series resistor 72. The potential at the reference point 69 therefore corresponds to the potential at the electrical midpoints of both potentiometers 42 and 49.

The potential at the output of the final thickness gauge 4—09 is so selected that when the finished material is of the correct desired thickness, then the voltage on conductor 73 leading from the gauge 4—09 will be equal to the reference potential at point 69 and therefore also equal to the potentials at the electrical midpoints of potentiometers 42 and 49. With the "Automatic-Manual" switch 17 in its "Manual" position, the transfer contact 64 of relay 15 which maintains the clutch 48 connected also keeps the operating wind 62 of cyclically operative relay 60 disconnected so that the contacts of relay 60 remain continuously in the positions shown. With the switch 17 in its "Manual" position, however, the mill is being manually adjusted to bring the output material to the correct gauge so that the potential on vibrator contact 57 from gauge 4—09 will be made equal to the midpoint potential of potentiometer 42. If there is a difference in potential between the stationary contacts 57 and 58, with the switch 17 in its "Manual" position, then an alternating potential will be applied to the input circuit 54 of amplifier 53 which will cause the servomotor 44 to drive the potentiometer 42 through clutch 48 so that the potentials on stationary vibrator contacts 57 and 58 are equalized. Under these reference conditions, obtained during manual adjustment of the mill at normal rolling speed, the potentiometer 42 will be brought to its center position, or nearly so, and the ganged potentiometers 40 and 41 will be similarly centralized. While the ganged potentiometers 41 and 42 are being centralized for correct output gauge, the potentiometer 1—19 is being adjusted by servomotor 1—25 to assume a position where the voltages on the stationary contacts 1—14 and 1—15 are equal and the potential on the movable contact 1—18 of potentiometer 1—19 is equal to the output voltage of tachometer generator 1—06 under manually adjusted conditions. The potentiometers 2—19, 3—19 and 4—19 are similarly adjusted during manual operation by their respective adjusting servomotors 2—25, 3—25 and 4—25.

When manual adjustment of the mill has been completed, the switch 17 is thrown to its "Automatic" position. Transfer contact 64 of relay 15 prepares clutch magnet 46 for control by the cyclically operative relay 60 and energizes the winding 62 of relay 60 for control by an electronic pulsing circuit later to be described. The right hand contact 58 of vibrator 55 is connected to the potentiometer 49 which may be adjusted without disturbing the adjustment of ganged potentiometers 40 and 41, provided that clutch 48 is open. The potentiometer 49 may also be adjusted along with the ganged potentiometers 40 and 41 when clutch 48 is closed.

In the "Automatic" position of switch 17, relay 60 operates and releases periodically. In the released position of cyclically operative relay 60, the clutch 48 is closed and the ganged potentiometers 40 and 41 are driven along with potentiometer 49. The potentiometer 42 is not in use. The right hand stationary contact 58 of vibrator 55 is then connected to the adjustable contact of potentiometer 49 so that servomotor 44 brings the potential of potentiometer 49 into equality with the potential on the left hand contact 57 of vibrator 55. The left hand contact 57 is alternately connected to output thickness error signal on conductor 73 and to the point of reference potential 69. The clutch 48 is alternately cut in and out by contact 75 of relay 60.

The potentiometer 49 is adjusted with reference to the output thickness error signal with the clutch 48 closed so that the ganged potentiometers 40 and 41 are simultaneously displaced and a speed correction is made in the speed of the first stand 1—00 independently of the speeds of other stands. The speeds of the other stands will be independently maintained at their respective ratios to the output speed as established during manual operation by their memory potentiometers 2—19, 3—19 and 4—19.

After corrective adjustment of the ganged potentiometers 40 and 41 with reference to the output thickness error signal, relay 60 operates and opens the clutch 48. With the ganged potentiometers 40 and 41 disconnected, and with stationary contact 57 of vibrator 55 connected to the point of reference potential 69, the potentiometer 49 is separately and independently centralized with respect to the reference potential at point 69. The cyclically operative relay 60 defers the next comparison of the reference potential set on potentiometer 49 to the output thickness error signal on conductor 73 until the effect of the speed adjustment caused by shifting the ganged potentiometers 40 and 41 has had an opportunity to produce a correction of the output thickness at gauge 4—09. The relay 60 is then released for a period of time sufficient to make a further correction in the settings of the ganged potentiometers 40 and 41 if further correction should be required.

Because of the continuous adjustment of the screwdown controls to maintain constant thickness at the output of the first stand 1—00, correlative speed adjustments will be continuously required in the speed of the first stand in order to maintain constant thickness for the finished product. The speeds of all of the other stands remain at the ratios set during the manual adjustment at normal rolling speed.

The electronic timer which controls the cyclically operative relay 60 comprises two twin triodes 80 and 81 (FIGURE 2). A timing control potential is derived from the tachometer generator 1—06 at the output of the first stand 1—00. This timing control potential is applied to a potentiometer 82 and an adjustable portion thereof is applied to one of the grids 83 of the twin triode 81. Assuming that the relay 60 has just operated to provide a time delay sufficient for a correction in the speed of the first stand to reach the output of the mill, the circuit of a resistor 84 will have just been broken by relay contact 85. The opening of the circuit resistor 84 raises the potential at the anode 86 of tube 81 which is associated with the grid 83. The other anode 87 of tube 80 is connected to its associated grid for operation as a diode. A capacitor 88 thereupon starts to charge through a plate resistor 89 common to the anodes 86 and 87 which are connected together. The charging circuit includes an adjustable series resistor 90 for adjusting the timing cycle.

The tube 80 is connected as a trigger circuit. With relay 60 just operated, the left hand side including the anode 91 is conductive and the relay winding 62 is energized. The charge in capacitor 88 has not yet built up to a sufficient large positive potential to render the right hand side including the anode 92 conductive. After a time interval, the capacitor 88, which is connected to the right hand grid 93 of tube 80 through an adjustable resistor 94, will cause the grid 93 to become sufficiently charged to a positive potential to start conduction in the right hand side of tube 80 through anode 92. When this occurs, increased current flow commences in the plate resistor 95 which is in series with anode 92. A reduction in potential drop then takes place across the serially connected resistors 96 and 97 which are connected in series with the plate resistor 95. The grid 98 of the left hand side of tube 80, which is connected to the junction between resistors 96 and 97, then becomes more negative and tends to shut off current flow through anode 91 to relay winding 62. At the same time, increased current flow in the common cathode resistor 99 makes the cathode become increasingly positive with respect to the grid 98. As a result, current flow through the relay winding 62 is abruptly reduced and the relay 60 releases. Upon the release of relay 60, resistor 84 is connected to reduce the voltage on the anodes 86 and 87 of tube 81. Charging of capacitor 88 is discontinued and the capacitor then discharges through grid 93 of the right hand side of tube 80, the discharge rate being adjustable by means of the adjustable resistor 94. After discharge has proceeded to a point where conduction in the right hand side of tube 80 is reduced, current flow through resistor 95 is reduced and the left grid 98 becomes more positive. Current flow through the common cathode resistor increases, thereby raising the cathode potentials. Relay winding 62 is again energized and the right hand side of tube 80 is again nonconductive. Operation of the relay 60 which accompanies the energization of winding 62 disconnects the resistor 84 at contacts 85 and the cycle starts over again. The cycle is repeated continuously so long as the "Automatic-Manual" switch is in its "Automatic" position.

The conductivity of the right hand side of tube 81 will depend upon the positive potential applied to grid 83. This, in turn, is governed by the voltage of the first stand tachometer generator 1—06. The higher the output speed of the mill, the greater will be the negative potential applied to the right hand grid 83 of tube 81. The more negative the grid 83, the less will be the potential drop in plate resistor 89 due to current flow through anode 86. This, in turn, will increase the potential available for charging the capacitor 88 and hence decrease the time required to release the relay 60. By proper adjustment of the variable resistors 90 and 94 and the potentiometer 82, the time required to release relay 60 may be made nearly equal to the transit time of any predetermined point on the strip 10 from the first stand 1—00 to the output gauge detector 4—09 over a wide range of mill operating speeds.

Figure 4:
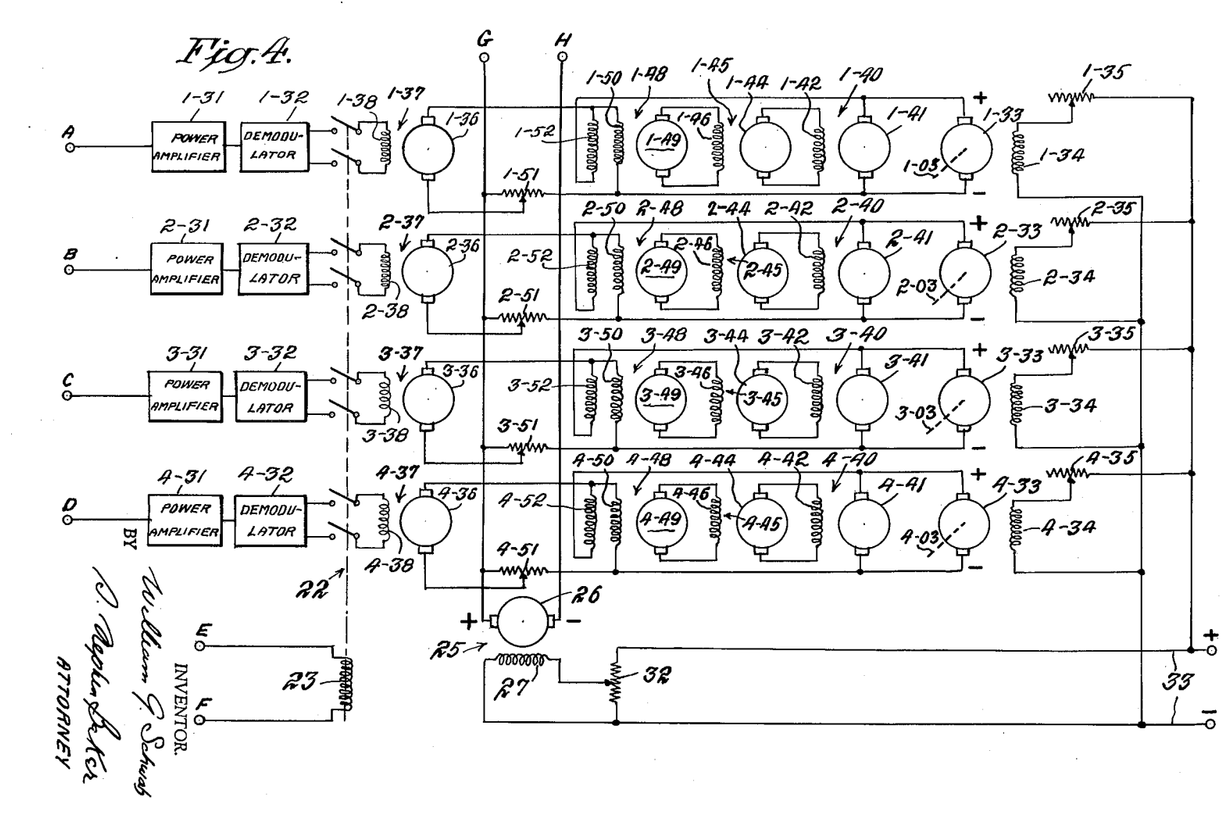

Reference will now be made to the modified embodiment of the invention shown in the combination of FIGURES 2 and 4 taken together and with the correspondingly lettered terminals A to H of the two figures connected to each other. The system of FIGURE 4 differs from that of FIGURE 3 in that common generator 25 is of low capacity and is used to generate a mill reference voltage which is adjustable to vary the speeds of all of the drive motors in unison. The field winding 27 of the common generator 25 is connected to the direct current supply line 33 through a master speed control potentiometer 32. The armature 26 of the common generator 25 produces a terminal voltage which may be conveniently adjusted by means of the master potentiometer 32.

The terminal voltage of the armature 26 is supplied to the potentiometers 1—19, 2—19, 3—19 and 4—19, as before, via connections G and H. Instead of being used to furnish armature voltage to the drive motors, however, the reference voltage from armature 26 is used to control separate exciters for individual generators, one generator being provided for each of the drive motors.

There are suitably driven individual generators 1—40, 2—40, 3—40 and 4—40 having armatures 1—41, 2—41, 3—41 and 4—41, respectively, which are directly connected to the drive motor armatures 1—33, 2—33, 3—33 and 4—33. The drive motor field windings 1—34, 2—34, 3—34 and 4—34 are excited at adjustably fixed individual potentials from the constant voltage supply line 33 through separate field rheostats 1—35, 2—35, 3—35 and 4—35. The individual generators 1—40, 2—40, 3—40 and 4—40 comprise field windings 1—42, 2—42, 3—42 and 4—42 which are connected to the armatures 1—44, 2—44, 3—44 and 4—44 of exciters 1—45, 2—45, 3—45 and 4—45, respectively. Each exciter 1—45, 2—45, 3—45 and 4—45 is provided with a field winding 1—46, 2—46, 3—46 and 4—46, which is supplied with exciting current from a reference voltage controlled generator 1—48, 2—48, 3—48 and 4—48, respectively.

Each reference voltage controlled generator comprises an armature 1—49, 2—49, 3—49 and 4—49 which is connected directly to the field winding 1—46, 2—46, 3—46 and 4—46, respectively, of its associated exciter. The reference voltage controlled generators 1—48, 2—48, 3—48 and 4—48 comprise main field windings 1—50, 2—50, 3—50 and 4—50 which are connected to the source of reference voltage or armature 26 through individually adjustable potentiometers 1—51, 2—51, 3—51 and 4—51 and through the armatures 1—36, 2—36, 3—36 and 4—36 of speed regulating generators 1—37, 2—37, 3—37 and 4—37, respectively. The reference voltage controlled generators also comprise negative feedback field windings 1—52, 2—52, 3—52 and 4—52 which are connected to the respective drive motor armatures 1—33, 2—33, 3—33 and 4—33 for supplementary control of the drive motor armature voltages and for stability of speed regulation.

During operation of the mill with the "Automatic-Manual" switch 17 in its "Manual" position, the drive motor speeds may be individually adjusted by means of the potentiometers 1—51, 2—51, 3—51 and 4—51 or by the field rheostats 1—35 etc., or both and the general mill speed is adjusted by means of the master control 32. When the switch 17 is operated to its "Automatic" position, the speed regulating generators 1—37, 2—37, 3—37 and 4—37 apply corrective potentials as and when required, to the main field windings 1—50, 2—50, 3—50 and 4—50 of the reference voltage controlled generators.

From the foregoing, it will be seen that there is provided an automatic thickness control system which memorizes the skilled speed ratio adjustments made by the roller while the mill is operating at full rolling speed. When the mill is slowed down for threading the head end of a strip into the mill or passing the tail end of a strip out of the mill, an automatic gain control circuit shuts off the amplifiers for the speed controls which would otherwise attempt to exercise speed ratio control with the output speed of the mill so low that thickness control is impossible.

As soon as the general speed of the mill is accelerated and remains within the range of speeds where thickness control is possible, the servomotor amplifiers again exercise their speed control effects. Any speed adjustments which may be required are made manually by the roller at full rolling speed and with the "Automatic-Manual" switch in its "Manual" position. Such adjustments are then memorized by the speed control potentiometers and maintained by the control amplifiers.

An automatic screw-down control mechanism maintains constant thickness at the output of the first stand. The automatic screw-down adjustments of the first stand may disturb the finished thickness of the strip as it emerges from the last stand because the speed ratios of the several stands are held at their respective correct memorized values. Accordingly, minor individual corrective adjustments are made in the speed of the first stand alone with respect to the controlled speeds of the other stands in order to obtain the desired nominal output thickness. Since the effect of any corrective adjustment in the speed of the first stand will not be reflected in the finished thickness until the strip being rolled in the first stand has had time to reach the output thickness gauge, such corrections are made cyclically, as and when required, at time intervals spaced apart sufficiently to permit the strip of corrected thickness to reach the thickness gauge at the mill output. The spacing of the corrective time intervals varies inversely with respect to the general mill speed and the timer is regulated accordingly by a tachometer generator associated with one of the stands so that speed adjustments of the first stand are made more frequently at higher mill speeds than at lower mill speeds.

As a result of this type of operation, automatic thickness control is maintained at lower mill speeds than can be accomplished by manual control and particularly during acceleration and deceleration of the mill for passing the head and tail end of each strip. Accordingly, more acceptable strip of correct gauge is rolled than is possible by manual control of the mill and especially near the head end and tail end of each strip.

There has been shown what is now considered a preferred embodiment of the invention but it is obvious that numerous changes and omissions may be made without departing from its spirit.

What is claimed is:

1. The method of maintaining a constant desired thickness in the finished rolled product emerging from a multi-stand rolling mill which comprises the steps of initially adjusting the rolling speeds and pressures of the several stands to obtain substantially the desired thickness in said finished product, maintaining a predetermined, constant velocity ratio for the partially finished product emerging from each stand, other than the last stand, with respect to the velocity of the finished product emerging from said last stand throughout an operational range of strip outputs of said mill greater than the strip output during threading, simultaneously adjusting the pressure between the rolls of the first stand to maintain a constant thickness in the product entering the second stand, and separately varying the rolling speed of the first stand while maintaining the rolling speeds of all other stands constant, the magnitudes of said variations in the rolling speed of said first stand correcting for variations in the thickness of the finished rolled product emerging from the last stand.

2. The method of regulating the operation of a multi-stand rolling mill to maintain a predetermined desired nominal thickness in the finished rolled strip form product emerging from the last stand thereof which comprises the steps of adjusting the relative speeds of all of the stands of said mill to obtain said nominal thickness with said mill operating at a high normal rolling speed, recording the respective ratios of the several linear velocities of the strip with respect to each other as said strip emerges from each stand, said velocity ratios producing said nominal thickness, accelerating all of the stands of said mill in unison from a low velocity threading speed to said normal rolling speed at the commencement of the rolling of said strip after threading the head end thereof through said mill, decelerating all of the stands of said mill in unison from said normal rolling speed to said threading speed before passing the tail end of said strip out of said mill, and maintaining the respective velocity ratios for said strip unchanged as said strip emerges from each stand during the course of said accelerating and decelerating steps which ratios were recorded during said recording step, whereby said nominal thickness will be maintained during said accelerating and deceleraing steps.

3. The method according to claim 2, comprising the further step of adjusting the rolling pressure applied to said strip in the first stand of said mill to maintain constant thickness in said strip as it enters the second stand of said mill.

4. The method according to claim 3 comprising the further step of separately correctively adjusting the strip velocity of the portion of said strip emerging from said first stand while maintaining constant velocity in the portions of said strip emerging from all others of said stands for maintaining said constant nominal thickness in said finished product.

5. The method according to claim 4 which comprises the further step of making a corrective adjustment in said speed of said first stand, waiting for a time interval sufficient for the effect of said corrective adjustment to appear in thickness of said finished product, checking the thickness of said finished product after said interval, and making any required further corrective adjustment in the speed of said first stand after said checking step.

6. A thickness control system for maintaining a predetermined desired nominal finished thickness for a rolled strip product emerging from the last stand of a multi-stand rolling mill, comprising in combination individual driving means for each stand of said mill, a plurality of individually adjustable speed control means connected to each of said driving means for separately adjusting the rolling speed of each stand, master speed control means connected to all of said driving means for varying the rolling speeds of all of the stands of said mill in unison, a plurality of velocity measurement devices one of which engages said strip at it emerges from each of the stands of said mill, and memory means connected to all of said velocity measurement devices and to said individually adjustable speed control means for separately controlling the individual speed adjustment of the driving means of each stand, said memory means being effective to maintain the ratio of the linear velocity of said product as it emerges from each individual stand of said mill in constant ratio to the velocity of said finished product as it emerges from the last stand of said mill during variation of said speeds in unison by said master speed control means.

7. A control system according to claim 6, further comprising screw-down means for regulating the rolling pressure of said first stand, a thickness gauge disposed between the first and second stands of said mill for measuring the thickness of said product as it emerges from the first stand, and thickness control means connected to said screw-down control means for maintaining the thickness of said product constant as it enters said second stand.

8. A control system according to claim 7, further comprising measuring means for measuring the deviation of the thickness of said finished product from said nominal thickness, and means connected to said measuring means and to said individually adjustable speed control means for separately correctively adjusting the speed of the first stand of said mill for maintaining said nominal thickness.

9. Thickness control apparatus for maintaining a predetermined nominal thickness for a rolled strip product as it emerges from the last stand of a multi-stand tandem rolling mill, comprising a set of cooperating rolls in each stand for reducing the thickness of said strip as it passes therebtween, a plurality of driving means each connected to drive one of said sets of rolls, a plurality of individually adjustable speed control means each connected to regulate the speed of one of said driving means, strip velocity measuring means disposed at the output side of said stand for separately measuring the linear velocity of said strip as it emerges from between each of said sets of rolls, memory means connected to each of said velocity measuring means for retaining the measurement thereof, master speed control means connected to all of said driving means for varying the rolling speeds of said stands in unison, and speed regulating means connected to all of said individually adjustable speed control means and to all of said memory means for maintaining the several speeds of said strip as it emerges from each of said stands at predetermined fixed ratios with respect to each other during speed variations of said stands in unison by said master speed control means.

10. Control apparatus according to claim 9, and further comprising a first thickness gauging means disposed at the output side of the first stand of said mill, a second thickness gauging means disposed at the output side of the last stand of said mill, screw-down control means connected to said first thickness gauging means for maintaining constant thickness in said strip as it emerges from said first stand, and separate speed regulating means connected to the independently adjustable speed control means for said first stand and to said second thickness gauging means for independently correctively adjusting the rolling speed of said first stand to maintain said nominal thickness for said product as it emerges from said last stand.

11. Control apparatus according to claim 10, and further comprising cyclically operative timing means connected to said supplementary speed regulating means and to said second thickness gauging means for periodically making said corrective adjustments of the rolling speed of said first stand at intervals no shorter than the transit time of said strip fro msaid first stand to said second thickness gauging means.

12. Thickness control apparatus for maintaining a predetermined nominal thickness in a rolled strip product as it emerges from the last stand of a multi-stand rolling mill, said apparatus comprising a set of cooperating rolls in each stand for reducing the thickness of said strip as it passes therebetween, a plurality of individual drive motors each comprising an armature mechanically connected to drive one of said sets of rolls, means for supplying current to each of said armatures, master speed control means for varying the voltages of the several currents supplied to all of said armatures in unison to change the general speed of said mill, individually adjustable speed control means for separately adjusting the speed of each armature, switching means having a manual position and an automatic position, strip velocity measuring means disposed at the output side of each of said stands, a plurality of memory means each connected to one of said strip velocity measuring means and operative in the manual position of said switching means to retain the velocity indication of each of said velocity measuring means during manual adjustment of said individually adjustable speed control means, and a plurality of speed correction means each connected to one of said memory means and to one of said drive motors said speed correction means being effective with said switching means in its automatic position to retain the speeds of all of said armatures at the same ratios with respect to each other to which said armatures were adjusted with said switching means in its manual position, said speed ratios being maintained during operation of said master speed control means for acceleration and deceleration of said mill.

13. Control apparatus according to claim 12 further comprising means responsive to the strip output speed of said mill for suppressing operation of said speed correction means when the strip output speed of said mill is reduced below predetermined minimum value.

14. Control apparatus according to claim 12, and further comprising a first thickness gauging means disposed at the output side of the first stand of said mill, a second thickness gauging means disposed at the output side of the last stand of said mill, screw-down control means connected to said first thickness gauging means for maintaining constant thickness in said strip as it emerges from said first stand, and separate speed regulating means connected to the independently adjustable speed control means for said first stand and to said second thickness gauging means for independently correctively adjusting the rolling speed of said first stand to maintain said nominal thickness for said product as it emerges from said last stand.

15. Control apparatus according to claim 14, and further comprising cyclically operative timing means connected to said supplementary speed regulating means and to said second thickness gauging means for periodically making said corrective adjustments of the rolling speed of said first stand at intervals no shorter than the transit time of said strip from said first stand to said second thickness gauging means.

16. Control apparatus according to claim 12 wherein said means for supplying current to all of said armatures comprises a common energizing circuit for all of said armatures, said apparatus further comprising a common generator connected to said energizing circuit, and in which said master speed control means is connected to said common generator for varying the output voltage thereof.

17. Control apparatus according to claim 12, in which said means for supplying current to all of said armatures comprises a separate generator for each motor, each generator being connected to one of said armatures, and in which said master speed control means comprises means for generating an adjustable reference voltage, said apparatus further comprising means responsive to said reference voltage and separately adjustably connected to each of said generators for varying the output voltages of said generators in unison in accordance with variations in magnitude of said reference voltage.

18. Thickness control apparatus for maintaining a predetermined nominal thickness in a rolled strip product as it emerges from the last stand of a tandem multi-stand rolling mill, said apparatus comprising a set of cooperating rolls in each stand for reducing the thickness of said strip as it passes between said rolls, a plurality of individual drive motors each having an armature connected to drive one of said sets of rolls, means for supplying current to each of said armatures, master speed control means for simultaneously varying the voltages of the several currents supplied to all of said armatures in unison to vary the strip output speed of said mill, individually manually and electrically adjustable speed control means connected to each motor for separately adjusting the rolling speed of each set of rolls, switching means having a first position for use during manual adjustment of said individual speed control means and a second position for use during electrical control of the speed of said motors, a plurality of strip velocity measuring means each disposed at the output side of one of said stands and each generating a voltage of magnitude proportional to the velocity of said strip as it emerges from between one of said sets of rolls, an adjustable potentiometer associated with each stand, an energizing circuit for all of said potentiometers, said energizing circuit having a voltage applied thereto which is controlled by said master speed control means, said voltage applied to said potentiometers being proportional to said strip output speed of said mill, a plurality of servomotor means each connected to one of said potentiometers and connected by said switching means in its first position to one of said strip velocity measuring means, said servomotor means adjusting said potentiometer in accordance with the strip velocity during manual adjustment of said individual speed measuring means, said servomotor means being rendered inoperative by said switching means in its second position, and a plurality of speed correction means each connected to one of said motors and to one of said potentiometers with said switching means in its second position for maintaining the several velocities of said strip upon emergence from each stand at constant ratios with respect to each other during acceleration and deceleration of said mill by said master speed control means.

19. Control apparatus according to claim 18, and further comprising a first thickness gauging means disposed at the output side of the first stand of said mill, a second thickness gauging means disposed at the output of the last stand of said mill, screw-down control means connected to said first thickness gauging means for maintaining constant thickness in said strip as it emerges from said first stand, and supplementary speed regulating means connected to apply a corrective speed adjustment to said motor of said first stand indpendently of any other motor, said supplementary speed regulating means being responsive to said second thickness gauging means for maintaining said nominal thickness of said strip product as it emerges from said last stand.

20. Control apparatus according to claim 19 in which said supplementary speed regulating means comprises adjustable resistor means connected to the potentiometer associated with said first stand for displacing the electrical center thereof.

21. Control apparatus according to claim 19, and further comprising cyclically operative timing means connected to said supplementary speed regulating means and to said second thickness gauging means for periodically making said corrective adjustments of the rolling speed of said first stand at intervals no shorter than the transit time of said strip from said first stand to said second thickness gauging means.

References Cited in the file of this patent
UNITED STATES PATENTS

| | | |
|---|---|---|
| 1,514,178 | Sheperdson | Nov. 4, 1924 |
| 1,764,312 | Jenks | June 17, 1930 |
| 1,969,536 | Winne | Aug. 7, 1934 |
| 2,039,914 | McBane | May 5, 1936 |
| 2,124,518 | Marquart | July 19, 1938 |
| 2,131,541 | Pease et al. | Sept. 27, 1938 |
| 2,134,514 | Heyman | Oct. 25, 1938 |
| 2,268,217 | Lessmann | Dec. 30, 1941 |
| 2,287,283 | Weber | June 23, 1942 |
| 2,295,327 | Bendz | Sept. 8, 1942 |
| 2,342,767 | Stoltz | Feb. 29, 1944 |
| 2,544,467 | Michel | Mar. 6, 1951 |
| 2,626,376 | Harder et al. | Jan. 20, 1953 |
| 2,761,967 | Rockafellow | Sept. 4, 1956 |
| 2,765,402 | Bivens | Oct. 2, 1956 |
| 2,883,895 | Vossberg | Apr. 28, 1959 |

OTHER REFERENCES

Rolling Slabs into Strip Steel (C. A. Vossberg), Control Engineering, September 1956, pp. 116–117.

Continuous Gaging, Automation March 1956, pp. 52–53.